Jan. 14, 1941.   C. R. SMALLEY   2,228,413
WHEEL SUSPENSION UNIT
Filed Jan. 27, 1939   2 Sheets-Sheet 2

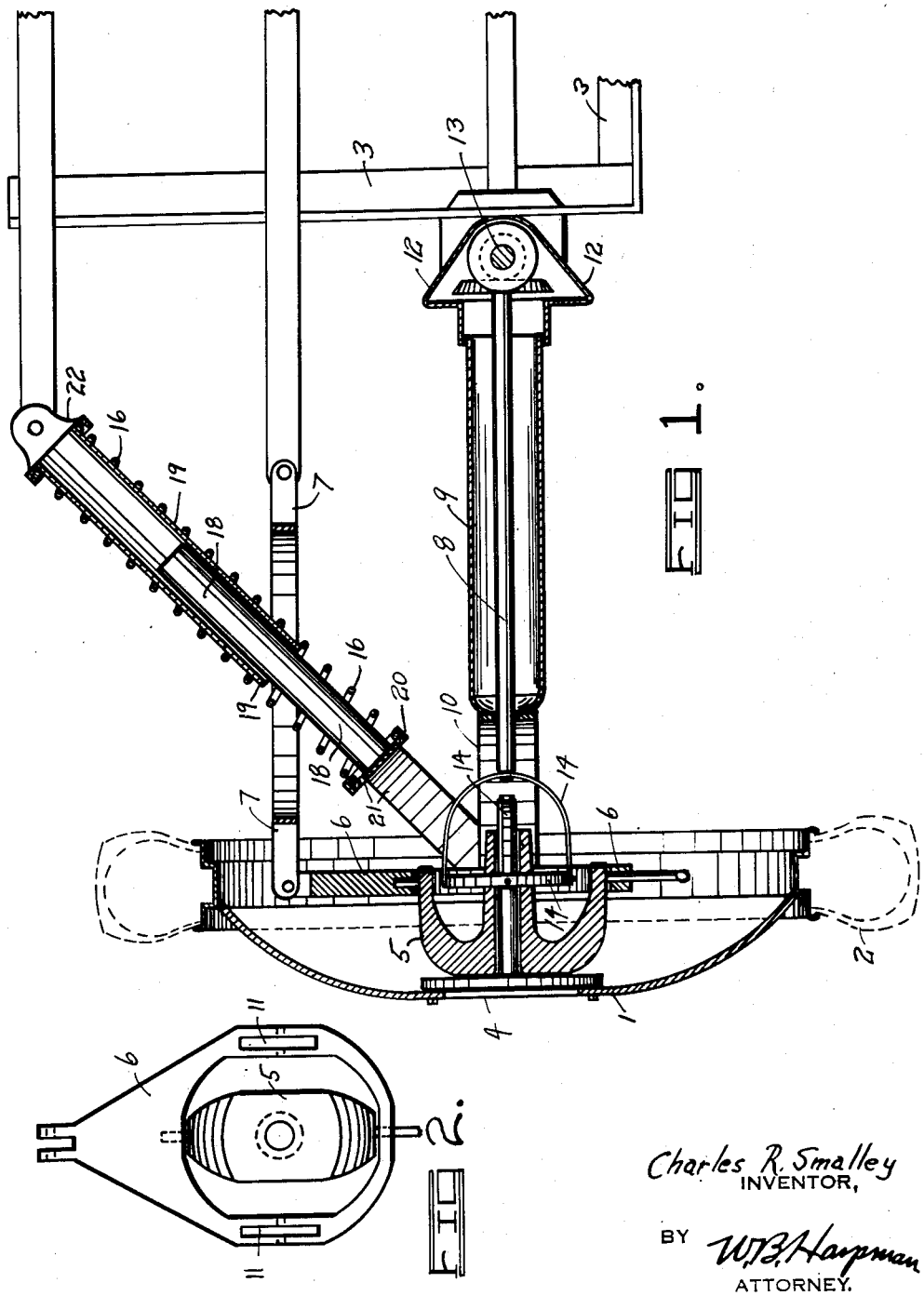

Charles R. Smalley
INVENTOR,
BY W. B. Harpman
ATTORNEY.

Patented Jan. 14, 1941

2,228,413

UNITED STATES PATENT OFFICE 2,228,413

WHEEL SUSPENSION UNIT

Charles R. Smalley, Youngstown, Ohio

Application January 27, 1939, Serial No. 253,067

5 Claims. (Cl. 180—43)

This invention relates to motor vehicles and more particularly to wheel suspensions of the independent type.

The principal object of this invention is to provide a wheel suspension which is simple and easy to construct and which will result in improved riding qualities and reduce vibrational disturbances.

A further object of this invention is the provision of a wheel suspension which may be applied to the suspension of the driving road wheels of a vehicle and to the steering road wheels of a vehicle and which, through its unique construction, may be utilized for both driving and steering the road wheels, thus making it possible to construct a motor vehicle which may be driven through two or four of its road wheels and steered through two or four of its road wheels.

A further object of this invention is the provision of a wheel suspension of double link type which incorporates the use of a coil spring which resists rising movement of the road wheel with respect to the vehicle and is so positioned that it may be directly opposed by the coil spring of the suspension unit upon the opposite side of the vehicle. Thus the resistance thru the coil spring to the rising motion of the road wheel may be opposed by the opposite suspension unit without the usual stresses being applied to the frame of the vehicle.

A still further object of this invention is the provision of a wheel suspension mechanism, each unit of which forms a complete steering or driving unit or which may be utilized for both steering and driving the vehicle and which will enable the frame structure of the vehicle to be simply formed and at the same time provides for the placement of the power unit of the vehicle in any one of a number of positions in the said frame.

A still further object of this invention is the provision of an independent wheel suspension unit thru which the vehicle so equipped may be braked as well as driven.

A still further object of this invention is the provision of a wheel suspension in which the stress and strain of the action thereof is carried directly upon solid linkage with respect to the frame of the vehicle and the spring action is thus entirely independent and free from these stresses.

With the foregoing and other objects in view which will appear as the description proceeds, the invention resides in the combination and arrangement of parts and in the details of the construction hereinafter described and claimed, it being understood that changes in the precise embodiment of the invention herein disclosed, can be made within the scope of what is claimed, without departing from the spirit of the invention.

The invention is illustrated in the accompanying drawings, wherein:

Figure 1 is a cross sectional elevation of the wheel suspension unit showing in detail the steering and driving provisions thereof.

Figure 2 is a detail view of a steering knuckle carrier which forms a part of the suspension unit shown in Figure 1.

Figure 3:
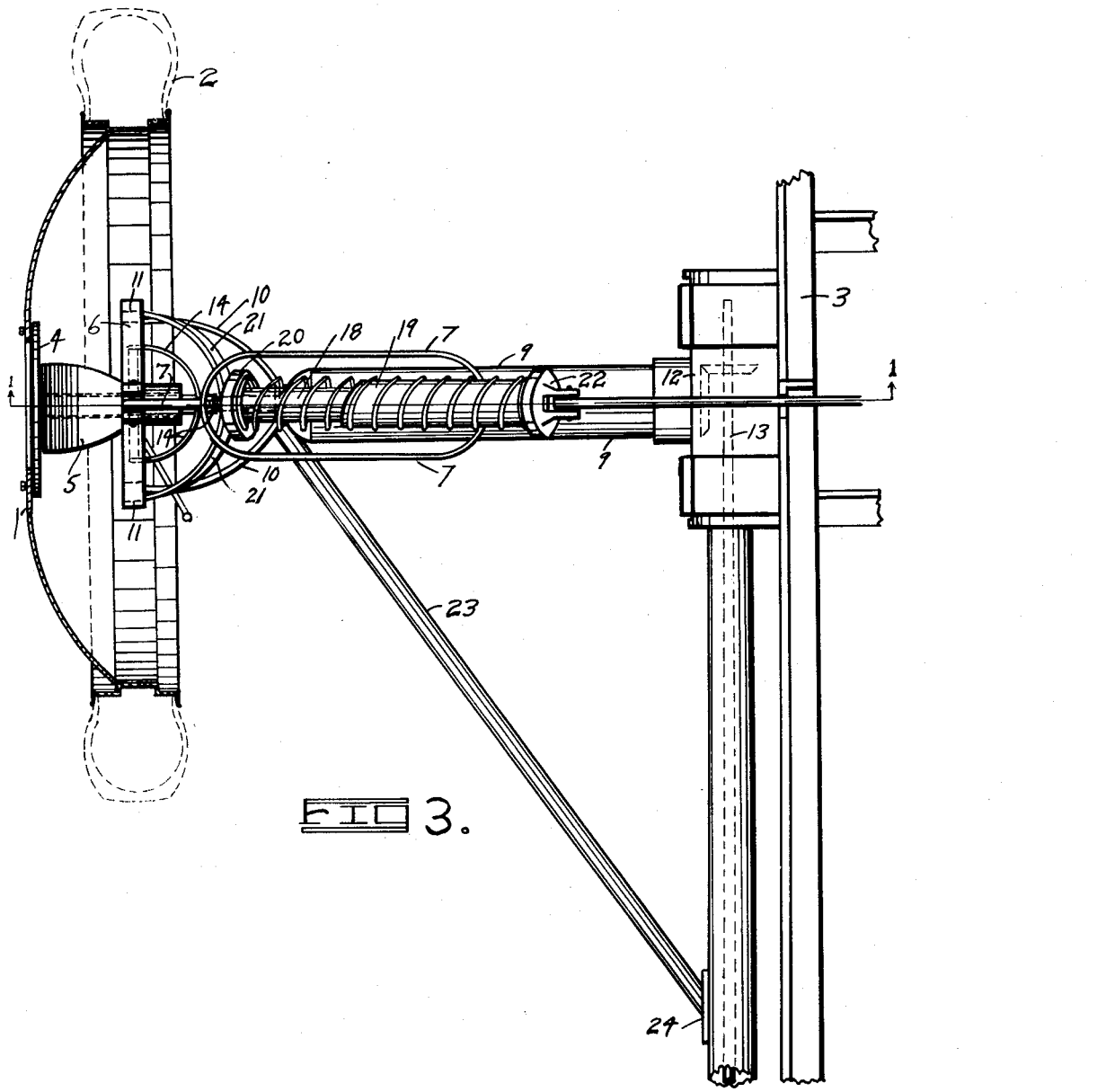
Figure 3 is a top plan view with parts in cross section of the wheel suspension unit shown in Figure 1, together with a portion of the associated driving means and a portion of the frame of the vehicle to which the assembly is attached.

By referring to the drawings, it will be seen that the invention comprises a wheel suspension unit in which the numeral 1 designates a wheel equipped with the usual tire 2. This wheel is attached to an automotive vehicle frame 3 by a wheel suspension unit which comprises in detail a flanged shaft 4 to which the wheel 1 is bolted, positioned within and extending through a steering knuckle 5. The steering knuckle 5 is positioned and supported by means of a steering knuckle carrier 6 which is in turn linked to the frame 3 by means of double linkage comprising an upper link 7 which is formed as a pair of bars united at their ends so as to provide for the encirclement of a spring unit, and a lower link which is in effect a triangular arm adapted to resist stresses applied to the wheel from front or rear and comprising a drive shaft 8 in a housing 9 and a brace rod 23. The housing 9 is provided at the the wheel end thereof with a pair of curved arms 10 which are pivoted to the steering knuckle carrier 6 by means of openings 11 in the sides thereof. The frame end of the housing 9 comprises a rounded housing 12 which is movably clamped to the frame 3 so as to permit its partial rotation about a main drive shaft 13. The drive shaft 8 and this main drive shaft 13 are connected by means of a gear and pinion.

In order that the wheel end of the drive shaft 8 may be operatively connected with the wheel flange 4, a universal joint 14 is positioned within the steering knuckle carrier 6 and around the hollow steering knuckle 5. The outer half of the universal joint is connected with the drive shaft 8 and the inner half is connected to the flanged shaft 4 where it extends out of the inner end of the hollow steering knuckle 5. It will thus be seen that an extremely compact driving mechanism is provided in that the necessary universal joint 14 is positioned partially within the steering knuckle carrier 6 and immediately around the pivot point of the steering knuckle. It is obvious that suitable steering linkage can be connected to the lower pivot of the hollow steering knuckle 5 where it emerges below the steering knuckle carrier 6 so that the wheel 1 and its wheel flange 4 and steering knuckle 5 may be turned upon the pivot point thereby.

In order that the wheel suspension unit may be properly sprung in relation to the frame 3, a coil spring 16 is positioned around and between portions of a spring carrier which comprises a telescopically arranged assembly of parts; a rod 18 is slidably engaged within a tube 19. The lower end of the rod 18 is provided with a bracket 20 which is adapted to carry the lower end of the coil spring 16. Formed on this bracket there are a pair of curved arms 21 which are pivoted to the steering knuckle carrier 6 in the openings 11 thereof, and which thus serve to suitably connect the spring unit of the device with the spindle carrier. The upper end of the tube 19 has a bracket 22 formed thereon which is adapted to be pivoted to a portion of the frame 3.

In order that this wheel suspension unit may be maintained in proper operating position in relation to the frame 3 of the vehicle, a brace rod 23 is positioned between the wheel end of the housing 9 and the housing of the main drive shaft 13 at a point 24 therein. It will be seen that this brace rod 23 is immovably connected to both the housing 9 and the main drive shaft housing and is part of the lower portion of the knuckle linkage, the whole of which pivots in effect on the main drive shaft 13.

It will thus be seen that the wheel suspension unit shown and described herein has certain inherent advantages, one of the most important of which is its ability to support the vehicle frame and maintain the wheel position in proper geometrical setting at all times. In this connection it is necessary that the upper link 7 of the device be of correct length in relation to the length of the lower link. It will also be apparent that another of the advantages of the suspension unit is its pivot action steering as the wheel and steering knuckle are so formed that a vertical line taken directly thru the center of the wheel and tire will cross the actual pivot point of the hollow steering knuckle and thus show that the steering action obtained is directly on the pivot point. Obviously this makes steering a great deal easier as it is not necessary to move one wheel forward and the other backward in turning as is now the practice.

Another advantage of this wheel suspension is the placement of the springing means which comprises the coil spring 16. It will be seen that this coil spring 16 and its mounting means are substantially longer and placed at a more efficient angle than has heretofore been customary. The coil spring 16 is used only to resiliently support the weight of the vehicle. None of the stress and strain of maintaining the road wheel in proper position in relation to the frame of the vehicle is carried thru this spring 16. The lower triangular arm of the parallel linkage resists all stresses applied to the wheel from front or rear and the upper arm of the double linkage resists all stresses which tend to change the camber of the wheel. The coil spring 16 is positioned between the frame of the vehicle and the pivot center of the steering knuckle carrier and the result is a minimum of unsprung weight.

Another advantage of this wheel suspension unit is the practicability of utilizing it in manufacturing a vehicle with two wheel steering and two wheel drive or by utilizing the same units providing for four wheel drive and four wheel steering, as desired. Thus, the various advantages of front and rear drive and four wheel drive, as well as front or four wheel steering, may be obtained by using practically the same parts.

What I claim is:

1. A wheel suspension unit adapted to be positioned between an automotive vehicle frame and a road wheel and comprising a double link structure adapted to maintain the road wheel in proper geometrical setting and having a pivoting structure carried on the wheel end thereof, the said double link structure and pivoting structure comprising an upper link and a housing having a steering knuckle carrier movably positioned on the wheel ends thereof, the said upper link being relatively shorter than the housing, a hollow steering knuckle positioned in the said steering knuckle carrier, a flanged shaft carried in the said hollow steering knuckle, the said flanged shaft being bolted to the said road wheel, a universal joint positioned between and connecting together the inner end of the said flanged shaft and a drive shaft positioned within the said housing so that motion of the drive shaft is conveyed through the universal joint to the said flanged shaft and road wheel, together with a spring positioned between the said steering knuckle carrier and the said vehicle frame, so that rising motion of the road wheel and steering knuckle carrier is resisted by the said spring.

2. A wheel suspension unit adapted to be positioned between an automotive vehicle frame and a road wheel and comprising a double link structure adapted to maintain the road wheel in proper position at all times, having a pivoting structure carried on the wheel end thereof, the said double link structure and pivoting structure comprising an upper link and a housing having a steering knuckle carrier movably positioned on the wheel ends thereof, the said upper link being relatively shorter than the housing, a hollow steering knuckle positioned in the said steering knuckle carrier, a flanged shaft carried in said hollow steering knuckle, the said flanged shaft being bolted to the said road wheel, a universal joint positioned between and connecting together an inner end of the said flanged shaft and a drive shaft positioned within the said housing so that motion of the drive shaft is conveyed through the universal joint to the said flanged shaft and road wheel, together with a spring carrier telescopically arranged between the said steering knuckle carrier and the said vehicle frame, a coil spring positioned around the said spring carrier and between opposing end sections thereof so that rising motion of the road wheel and steering knuckle carrier results in the compression of the said coil spring.

3. A wheel suspension unit adapted to be positioned between an automotive vehicle frame and a road wheel and comprising a double link structure having a pivoting structure carried on the wheel end thereof, the double link structure and pivoting structure comprising a short upper link and a longer lower link, a steering knuckle carrier movably positioned on the wheel ends of the said double link structure, a hollow steering knuckle positioned in the said steering knuckle carrier, a flanged shaft positioned in the said hollow steering knuckle and bolted to the said road wheel, the said double link structure being of appropriate lengths to insure the proper positioning of the road wheel so as to avoid the tendency to narrow the tread distance, together with a spring positioned between the said steering knuckle carrier and the said vehicle frame, so that rising motion of the road wheel and steering knuckle carrier is resisted by the spring.

4. A wheel suspension unit adapted to be positioned between an automotive vehicle frame and a road wheel and comprising a double link structure having a pivoting structure carried on the wheel end thereof, the said double link structure and pivoting structure comprising an upper link and a lower triangular link one portion of which comprises a housing, a steering knuckle carrier movably positioned on the wheel ends of the said double link structure, a hollow steering knuckle positioned in the said steering knuckle carrier, a flanged shaft partially positioned within said hollow steering knuckle, the said flanged shaft being bolted to the said road wheel, a universal joint positioned between and connecting together an inner end of the said flanged shaft and a drive shaft positioned within the said housing so that motion of the drive shaft is conveyed through the universal joint to the said flanged shaft and road wheel, a coil spring positioned between the said steering knuckle carrier and the said vehicle frame, the said upper link being relatively shorter than the said lower link so that the double link structure will maintain the said road wheel in proper position when it rises and falls.

5. A wheel suspension unit adapted to be positioned between an automotive vehicle frame and a road wheel and comprising a double link structure having a pivoting structure carried on the wheel end thereof, the said double link structure and pivoting structure comprising an upper link and a lower triangular link one portion of which comprises a housing, a steering knuckle carrier movably positioned on the wheel ends of the said double link structure, a hollow steering knuckle positioned in the said steering knuckle carrier, a flanged shaft positioned within said hollow steering knuckle, the said flanged shaft being bolted to the said road wheel, a flexible connection positioned between and connecting together an inner end of the said flanged shaft and a drive shaft positioned within the said housing, the said upper link being relatively shorter than the said lower link so that the double link structure will maintain the said road wheel in proper position when the road wheel rises and falls, together with a spring carrier telescopically arranged between the said steering knuckle carrier and the said vehicle frame, a coil spring positioned around the said spring carrier and between opposing end sections thereof so that rising motion of the road wheel and steering knuckle carrier results in the compression of the said coil spring.

CHARLES R. SMALLEY.